US012190886B2

(12) United States Patent
Pandit et al.

(10) Patent No.: US 12,190,886 B2
(45) Date of Patent: Jan. 7, 2025

(54) SELECTIVE INCLUSION OF SPEECH CONTENT IN DOCUMENTS

(71) Applicant: International Business Machines Corporation, Armonk, NY (US)

(72) Inventors: Sushain Pandit, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 17/448,967

(22) Filed: Sep. 27, 2021

(65) Prior Publication Data

US 2023/0267933 A1   Aug. 24, 2023

(51) Int. Cl.
| | |
|---|---|
| G10L 15/02 | (2006.01) |
| G06F 40/166 | (2020.01) |
| G10L 15/26 | (2006.01) |
| H04W 4/029 | (2018.01) |
| H04W 4/33 | (2018.01) |
| G06T 19/00 | (2011.01) |

(52) U.S. Cl.
CPC ............ *G10L 15/26* (2013.01); *H04W 4/029* (2018.02); *H04W 4/33* (2018.02); *G06T 19/006* (2013.01)

(58) Field of Classification Search
CPC .............................. G10L 15/22; G06F 16/5866
See application file for complete search history.

(56) References Cited

U.S. PATENT DOCUMENTS

| | | | |
|---|---|---|---|
| 8,954,330 B2* | 2/2015 | Koenig | G10L 21/10 |
| | | | 704/270 |
| 9,135,231 B1* | 9/2015 | Barra | G06F 40/151 |
| 10,614,828 B1 | 4/2020 | Cowburn | |
| 10,878,819 B1 | 12/2020 | Chavez | |

(Continued)

FOREIGN PATENT DOCUMENTS

| | | |
|---|---|---|
| CN | 102116941 A | 7/2011 |
| CN | 104464389 A | 3/2015 |

(Continued)

OTHER PUBLICATIONS

"Patent Cooperation Treaty PCT International Search Report", Applicant's File Reference: F22W2440, International Application No. PCT/CN2022/107340, International Filing Date: Jul. 22, 2022, Date of Mailing: Sep. 26, 2022, 9 pages.

*Primary Examiner* — Seong-Ah A Shin
(74) *Attorney, Agent, or Firm* — CANTOR COLBURN LLP; Jordan Schiller

(57) ABSTRACT

In an approach for enabling a user to visualize a transcript of a discussion via a head-mounted AR device and to selectively copy one or more parts of the transcript that is contextually relevant for inclusion in a new document file or a previously created document file, a processor captures audio of a spoken content of a first participant of a discussion via an AR device worn by a user. A processor analyzes the audio of the spoken content of the first participant. A processor converts the audio of the spoken content of the first participant to text to create a transcript. A processor creates a visualization of the transcript. A processor presents the visualization of the transcript to the user via the AR device. A processor enables the user to copy one or more parts of the transcript into a document file via a selection support.

17 Claims, 4 Drawing Sheets

(56) References Cited

U.S. PATENT DOCUMENTS

| | | | | |
|---|---|---|---|---|
| 2005/0171926 | A1* | 8/2005 | Thione | G10L 15/22 |
| | | | | 704/E15.04 |
| 2012/0059651 | A1* | 3/2012 | Delgado | H04W 4/80 |
| | | | | 704/E15.044 |
| 2014/0081634 | A1 | 3/2014 | Forutanpour | |
| 2014/0129207 | A1 | 5/2014 | Bailey | |
| 2016/0261673 | A1* | 9/2016 | Cardonha | H04W 4/18 |
| 2017/0133007 | A1* | 5/2017 | Drewes | G10L 15/02 |
| 2017/0263248 | A1* | 9/2017 | Gruber | G06F 40/166 |
| 2018/0067717 | A1* | 3/2018 | Limaye | G10L 15/08 |
| 2018/0101550 | A1* | 4/2018 | Calcaterra | G06N 5/022 |
| 2018/0197624 | A1* | 7/2018 | Robaina | A61B 90/37 |
| 2018/0307303 | A1* | 10/2018 | Powderly | G06T 19/006 |
| 2018/0350144 | A1* | 12/2018 | Rathod | G06Q 20/3224 |
| 2018/0374483 | A1 | 12/2018 | Florexil | |
| 2019/0317606 | A1* | 10/2019 | Jain | G06F 3/167 |
| 2019/0362312 | A1* | 11/2019 | Platt | G06Q 10/10 |
| 2019/0377753 | A1* | 12/2019 | Goldberg | G06F 16/55 |
| 2020/0368616 | A1* | 11/2020 | Delamont | H04N 13/239 |
| 2021/0173480 | A1* | 6/2021 | Osterhout | G06F 3/04815 |
| 2022/0068276 | A1* | 3/2022 | Munetomo | G06F 16/148 |
| 2022/0247824 | A1* | 8/2022 | Springer | H04L 67/147 |
| 2022/0374645 | A1* | 11/2022 | Santoro | G06F 40/295 |
| 2023/0247418 | A1* | 8/2023 | Sun | H04W 8/24 |
| | | | | 370/328 |
| 2023/0271083 | A1* | 8/2023 | Cai | A63F 13/655 |
| | | | | 463/35 |
| 2024/0031261 | A1* | 1/2024 | Mukherjee | H04L 41/02 |

FOREIGN PATENT DOCUMENTS

| | | |
|---|---|---|
| CN | 105554662 A | 5/2016 |
| CN | 109361527 A | 2/2019 |
| CN | 109923462 A | 6/2019 |
| CN | 110288861 A | 9/2019 |
| KR | 20110024880 A | 3/2011 |
| WO | 2019237428 A1 | 12/2019 |
| WO | 2021026617 A1 | 2/2021 |

\* cited by examiner

SELECTIVE INCLUSION OF SPEECH CONTENT IN DOCUMENTS

BACKGROUND OF THE INVENTION

The present invention related generally to the field of data processing, and more particularly to selective inclusion of speech content in documents.

Augmented reality (AR) is a live direct or indirect view of a physical, real-world environment the elements of which are augmented by computer-generated sensory input such as sound, video, graphics, or global positioning system data. AR is related to a more general concept called computer-mediated reality, in which a view of reality is modified (possibly even diminished rather than augmented) by a computer. AR enhances one's current perception of reality, whereas in contrast, virtual reality replaces the real world with a simulated one. AR techniques are typically performed in real time and in semantic context with environmental elements, such as overlaying supplemental information like scores over a live video feed of a sporting event.

With the help of advanced AR technology (e.g., adding computer vision and object recognition), the information about the surrounding real world of the user becomes interactive and digitally manipulable. Information about the environment and its objects is overlaid on the real world. This information can be virtual or real, e.g., seeing other real sensed or measured information such as electromagnetic radio waves overlaid in exact alignment with where they are in space. AR brings the components of the digital world into a person's perceived real world.

Hardware components for AR include a processor, a display, a plurality of sensors, and a plurality of input devices. Modern mobile computing devices like smartphones and tablet computers contain these elements which often include a camera and microelectromechanical system sensors, such as an accelerometer, a GPS, and a solid-state compass, making them suitable AR platforms.

Various technologies are used in AR rendering including optical projection systems, monitors, hand-held devices, and display systems worn on the human body. A head-mounted display (HMD) is a display device paired to a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide virtual reality users mobile and collaborative experiences.

AR displays can be rendered on devices resembling eyeglasses. Versions include eyewear that employ cameras to intercept the real-world view and re-display its augmented view through the eye pieces and devices in which the AR imagery is projected through or reflected off the surfaces of the eyewear lens pieces. A heads-up display, also known as a HUD, is a transparent display that presents data without requiring users to look away from their usual viewpoints. A precursor technology to the AR HUD was first developed for pilots in the 1950s. The precursor technology projected simple flight data into their line of sight thereby enabling them to keep their "heads up" and not look down at the instruments. Near eye AR devices can be used as portable HUDs as they can show data, information, and images while the user views the real world. Many definitions of AR only define it as overlaying the information. This is basically what a HUD does; however, practically speaking, AR is expected to include registration and tracking between the superimposed perceptions, sensations, information, data, and images and some portion of the real world.

SUMMARY

Aspects of an embodiment of the present invention disclose a method, computer program product, and computer system for enabling a user, who is participating in a class, meeting, or gathering with a plurality of participants, to visualize a transcript of the discussion via a head-mounted AR device and to selectively copy one or more parts of the transcript that is contextually relevant for inclusion in a new document file or a previously created document file.

In some aspects of an embodiment of the present invention, a processor captures audio of a spoken content of a first participant of a discussion via an AR device worn by a user. A processor analyzes the audio of the spoken content of the first participant. A processor converts the audio of the spoken content of the first participant to text to create a transcript. A processor creates a visualization of the transcript. A processor presents the visualization of the transcript to the user via the AR device. A processor enables the user to copy one or more parts of the transcript into a document file via a selection support.

In some aspects of an embodiment of the present invention, prior to capturing the audio of the spoken content of the first participant of the discussion via the AR device worn by the user, a processor identifies a plurality of participants who are present to participate in the discussion via the AR device. A processor assigns a first unique identification number to each participant of the plurality of participants. A processor authenticates the AR device of each participant of the plurality of participants. A processor identifies a physical location where the discussion is occurring. A processor assigns a second unique identification number to the physical location where the discussion is occurring. A processor creates an indoor positioning system that represents the physical location where the discussion is occurring.

In some aspects of an embodiment of the present invention, prior to capturing the audio of the spoken content of the first participant of the discussion via the AR device worn by the user, a processor enables the first participant to assign one or more permissions to each participant of the plurality of participants, wherein the one or more permissions determine whether each participant of the plurality of participants can copy the one or more parts of the transcript into the document file.

In some aspects of an embodiment of the present invention, a processor identifies the first participant by a tone of voice. A processor determines a direction from which the audio of the spoken content of the first participant originated via a beam forming sensor on the AR device worn by the user and the indoor positioning system. A processor creates a direction vector representing the direction from which the audio of the spoken content of the first participant originated. A processor determines a time when the audio of the spoken content of the first participant originated. A processor creates a time stamp representing the time when the audio of the spoken content of the first participant originated. A processor prepares a time scale to organize the audio of the spoken content of the first participant according to when the audio was captured.

In some aspects of an embodiment of the present invention, the transcript includes an identifying factor of the first participant, the direction vector representing the direction from which the audio of the spoken content of the first participant originated, and the time stamp representing the time when the audio of the spoken content of the first participant originated.

In some aspects of an embodiment of the present invention, a processor enables the user to point at a location of the first participant. A processor selects one or more parts of the transcript associated with the first participant.

In some aspects of an embodiment of the present invention, the document file is a new document file or a previously created document file, and wherein the one or more parts of the transcript are placed in a user-defined position.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that documents can be created or edited in a single user or in a multiple user environment. In a multiple user environment, the users can be either physically or virtually present to collaboratively create a document by typing out text manually or by using speech-to-text technology to type out text automatically. Embodiments of the present invention recognize that, in any multiple user environment involving an exchange of informational content, there can be several different and parallelly spoken contents. However, not every one of the spoken contents may be relevant to the document that is being created by the user. For example, in a classroom setting, students take notes while the professor speaks and when a question is asked and responded to with a specific answer. An answer to one question may be known to one or more students, whereas an answer to another question may not be as well-known to the one or more students. Because of this asymmetry, the students will selectively take notes. Therefore, embodiments of the present invention recognize that a system and method to capture audio of spoken content of a discussion, to create a transcript from the audio of the spoken content, and to enable a user to selectively copy one or more parts of the transcript that is contextually relevant for inclusion in a new document file or a previously created document file in a user-defined position is necessary.

Embodiments of the present invention provide a system and method by which a user, who is participating in a class, meeting, or gathering in a smart environment (i.e., augmented environment class, meeting, or gathering) or virtual environment (i.e., a virtual class, meeting, or gathering attended over the Internet) with a plurality of participants, can visualize a transcript of the discussion via a head-mounted Augmented Reality (AR) device. The transcript of the discussion also includes an identifying factor of the plurality of participants, the direction vector representing the direction from which the audio of the spoken content originated, and the time stamp representing the time when the audio of the spoken content originated. Embodiments of the present invention provide a system and method by which the user can selectively copy one or more parts of the transcript that is contextually relevant for inclusion in a new document file or a previously created document file.

Implementation of embodiments of the present invention may take a variety of forms, and exemplary implementation details are discussed subsequently with reference to the Figures.

Figure 1:
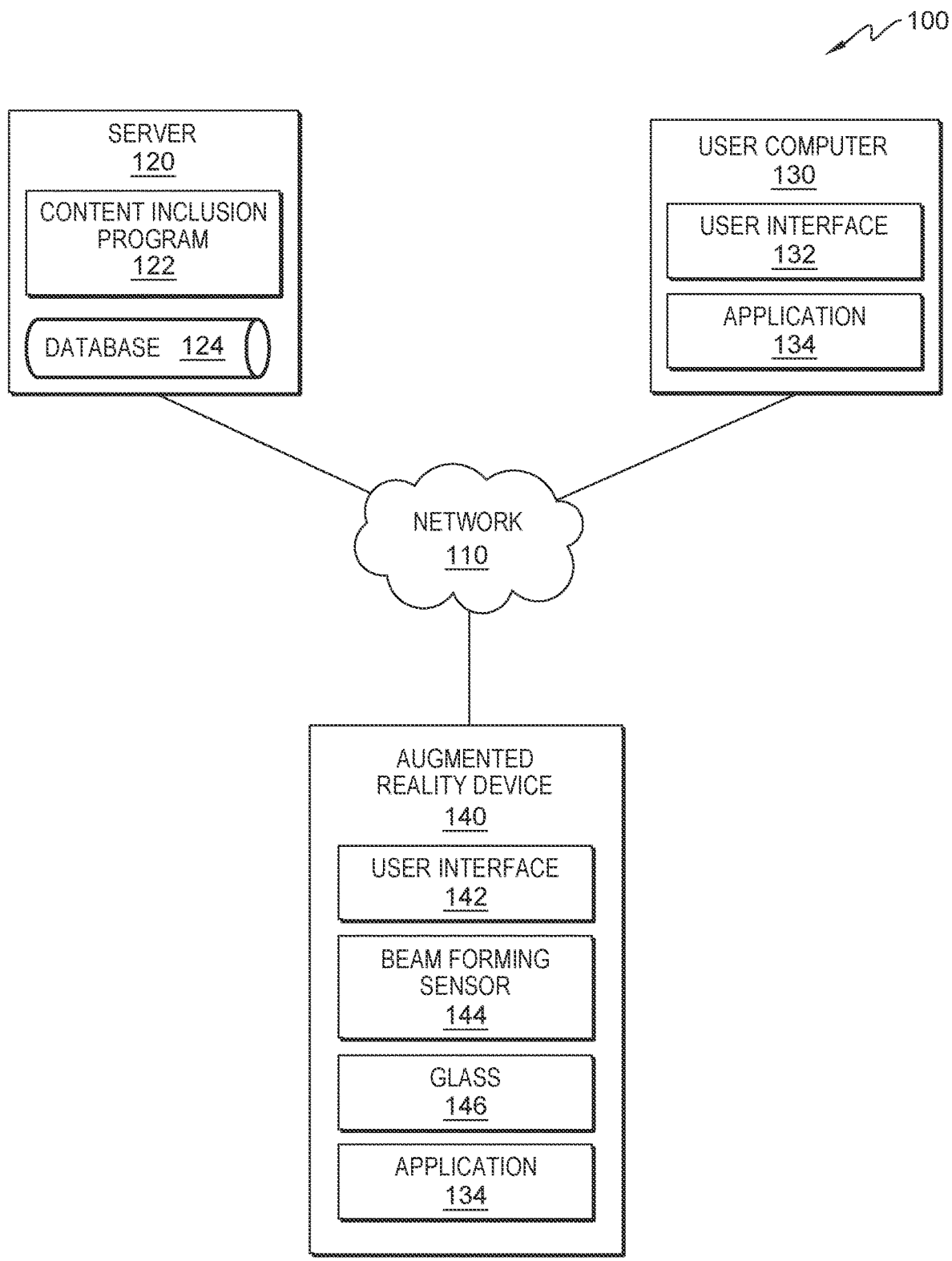
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120, user computing device 130, and AR device 140, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, AR device 140, and other computing devices (not shown) within distributed data processing environment 100.

Server 120 operates to run content inclusion program 122 and to send and/or store data in database 124. In an embodiment, server 120 can send data from database 124 to user computing device 130 and/or AR device 140. In an embodiment, server 120 can receive data in database 124 from user computing device 130 and/or AR device 140. In one or more embodiments, server 120 can be a standalone computing device, a management server, a web server, a mobile computing device, or any other electronic device or computing system capable of receiving, sending, and processing data and capable of communicating with user computing device 130 and AR device 140 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, AR device 140, and other computing devices (not shown) within distributed data processing environment 100 via network 110. Server 120 may include internal and external hardware components, as depicted and described in further detail in FIG. 4.

Content inclusion program 122 operates to enable a user, who is participating in a class, meeting, or gathering in a smart environment or a virtual environment with a plurality of participants, to visualize a transcript of the discussion via a head-mounted AR device. The transcript of the discussion also includes an identifying factor of the plurality of participants, the direction vector representing the direction from which the audio of the spoken content originated, and the time stamp representing the time when the audio of the spoken content originated. Content inclusion program 122 also operates to enable the user to selectively copy one or more parts of the transcript that is contextually relevant for inclusion in a new document file or a previously created document file. In the depicted embodiment, content inclusion program 122 is a standalone program. In another embodiment, content inclusion program 122 may be integrated into another software product, such as an AR meeting software. In the depicted embodiment, content inclusion program 122 resides on server 120. In another embodiment, content inclusion program 122 may reside on user computing device 130, AR device 140, or on another computing device (not shown), provided that content inclusion program 122 has access to network 110.

In an embodiment, the user of user computing device 130 registers with server 120 (e.g., via a corresponding application, e.g., application 138). For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via content inclusion program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124. The setup component of content inclusion program 122 is depicted and described in further detail with respect to FIG. 2. The operational steps of content inclusion program 122 are depicted and described in further detail with respect to FIG. 3.

In the depicted embodiment, content inclusion program 122 operates with user computing device 130 and AR device 140. In some embodiments, content inclusion program 122 operates with AR device 140 only.

Database 124 operates as a repository for data received, used, and/or generated by content inclusion program 122. A database is an organized collection of data. Data includes, but is not limited to, information about user preferences (e.g., general user system settings such as alert notifications for user computing device 130); information about alert notification preferences; the unique identification number assigned to the plurality of participants present to participate in the discussion via AR device; the indoor positioning system and the unique identification number assigned to the physical location where the discussion is occurring; the transcript of the text; an identifying factor of a participant; the time stamp representing the time when the audio of the spoken content of the participant originated; the direction vector representing the direction from which the audio of the spoken content of the participant originated; and any other data received, used, and/or generated by content inclusion program 122.

Database 124 can be implemented with any type of device capable of storing data and configuration files that can be accessed and utilized by server 120, such as a hard disk drive, a database server, or a flash memory. In an embodiment, database 124 is accessed by content inclusion program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that content inclusion program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Content inclusion program 122 enables the authorized and secure processing of personal data.

Content inclusion program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Content inclusion program 122 provides information regarding personal and/or confidential data and the nature (e.g., type, scope, purpose, duration, etc.) of the processing. Content inclusion program 122 provides the user with copies of stored personal and/or confidential company data. Content inclusion program 122 allows the correction or completion of incorrect or incomplete personal and/or confidential data. Content inclusion program 122 allows for the immediate deletion of personal and/or confidential data.

User computing device 130 operates to run user interface 132 through which a user can interact with content inclusion program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with content inclusion program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132 and application 134. User computing device 130 may include components as described in further detail in FIG. 4.

User interface 132 operates as a local user interface between content inclusion program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from content inclusion program 122 to a user via network 110. User interface 132 can also display or present alerts including information (such as graphics, text, and/or sound) sent from content inclusion program 122 to a user via network 110. In an embodiment, user interface 132 is capable of sending and receiving data (i.e., to and from content inclusion program 122 via network 110, respectively). Through user interface 132, a user can opt-in to content inclusion program 122; create a user profile; set user preferences and alert notification preferences; and log into application 134.

A user preference is a setting that can be customized for a particular user. A set of default user preferences are assigned to each user of content inclusion program 122. A user preference editor can be used to update values to change the default user preferences. User preferences that can be customized include, but are not limited to, general user system settings, specific user profile settings, alert notification settings, and machine-learned data collection/storage settings.

Machine-learned data is a user's personalized corpus of data. Machine-learned data includes, but is not limited to, data regarding spoken content that the user has seen or experienced (i.e., the source of spoken content, the direction of the vector of the spoken content, and the timeline of the spoken content) and past results of iterations of content inclusion program 122 including, but not limited to, data regarding spoken content that the user has selected and data regarding spoken content that the user has rejected.

Content inclusion program 122 self-learns by tracking user activity, by classifying and retaining new content, and by improving with each iteration of content inclusion program 122. Content inclusion program 122 tracks which spoken content or portion of a spoken content is repeatedly added to or removed from a document file. By tracking such data, content inclusion program 122 can learn which spoken content is relevant to the user (e.g., repeatedly adding certain spoken content or a portion of a certain spoken content to a document file) and which spoken content is irrelevant (e.g., repeatedly removing certain spoken content or a portion of a certain spoken content from a document file).

Content inclusion program 122 classifies spoken content and portions of spoken content based on the likelihood a user will include the spoken content or the portion of the spoken content in a document file. In an embodiment, content inclusion program 122 classifies spoken content and portions of spoken content on a scale of 1 (i.e., a low chance the spoken content or the portion of the spoken content will be included) to 10 (i.e., a high chance the spoken content or the portion of the spoken content will be included). By classifying and retaining such data, content inclusion program 122 can automatically filter out certain spoken content over time and ensure that repetitive information is not generated and sent to the user. Instead, content inclusion program 122 bypasses the repetitive information and locates new information for the user. Content inclusion program 122 can also recommend suggestions (e.g., on the likelihood of inclusion of certain spoken content) to the user so that the user can manually filter out certain spoken content.

For example, a professor asks the same redundant question every class to reinforce a point. Content inclusion program 122 self-learns the professor's pattern of questioning over time. Content inclusion program 122 uses the pattern of questioning as a feature vector to train a machine learning model to classify the spoken content according to the likelihood of inclusion of the spoken content in a document file on a scale of 1 (i.e., low) to 10 (i.e., high).

In another example, a student repeatedly answers questions in a hyperbolic fashion. By answering questions in such a manner, the student is not adding to the net information content. Content inclusion program 122 self-learns the student's pattern of answering questions (i.e., to repeatedly reject a certain spoken content or a portion of a certain spoken content). Therefore, content inclusion program 122 self-learns that the certain spoken content or a portion of the certain spoken content is not relevant to the user and should not be included in the document.

AR device 140 is a wearable device, such as Google Glass™, that provides a user who is wearing AR device 140 with an AR view of a transcript. It should be appreciated, however, that any other suitable means of AR device 140 may be used. Generally, AR is a live direct or indirect view of a physical, real-world environment whose elements are augmented (or supplemented) by computer-generated sensory input such as sound, video, or graphics. In the depicted embodiment, AR device 140 includes an instance of user interface 142, beam forming sensor 144, glass 146, and application 134. In an embodiment, AR device 140 performs a secure handshake with user computing device 130 using user interface 142.

As used herein, the term "augmented reality" refers to any technique for augmenting a real-world environment, such as a live video captured through a camera or recorded video, using computer-generated sensory input such as sound, video, graphics, or GPS data.

User interface 142 represents the interface between the user and AR device 140. In some embodiments, user interface 142 is a graphical user interface (GUI), a web user interface (WUI), and/or a voice user interface (VUI) that can display (i.e., visually) or present (i.e., audibly) text, user options, application interfaces, and instructions for operations sent from content inclusion program 122 to a user via network 110. User interface 142 can also display or present alerts including information (such as graphics, text, and/or sound) sent from content inclusion program 122 to a user via network 110. In an embodiment, user interface 142 is capable of sending and receiving data (i.e., to and from content inclusion program 122 via network 110, respectively). Through user interface 142, a user can perform a secure handshake with user computing device 130.

Beam forming sensor 144 identifies the direction from which the audio of the spoken content originated.

Glass 146 detects a participant speaking, captures the audio of the spoken content of the participant, identifies the participant, converts the audio of the spoken content to text, creates a visualization of the transcript of the text, provides access to the visualization of the transcript of the text to the user, and enables the user to select one or more parts of the transcript from the visualization.

Figure 2:
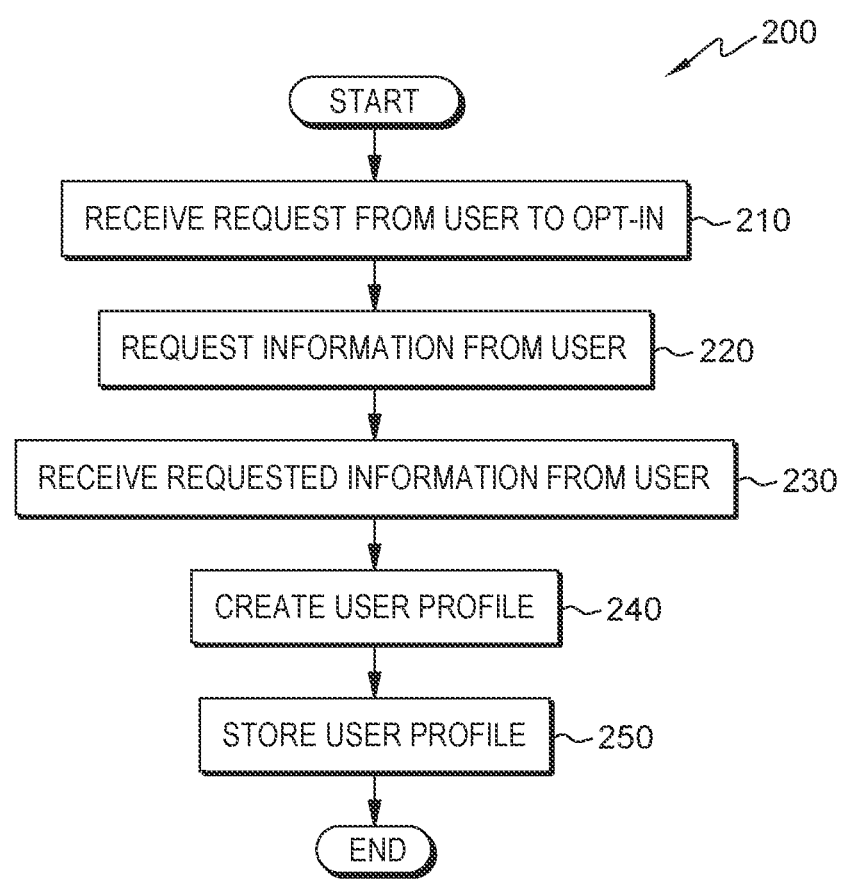
FIG. 2 is a flowchart illustrating the operational steps for a setup component of a content inclusion program, on a server within the distributed data processing environment of FIG. 1, in accordance with an embodiment of the present invention.

FIG. 2 is a flowchart, generally designated 200, illustrating the operational steps for a setup component of content inclusion program 122 on server 120 in distributed data processing environment 100, such as the one depicted in FIG. 1, in accordance with an embodiment of the present invention. In an embodiment, content inclusion program 122 completes a one-time setup with a user. The one-time setup allows for content inclusion program 122 to capture relevant information about the user to create a user profile. In an embodiment, content inclusion program 122 receives a request from the user to opt-in. In an embodiment, content inclusion program 122 requests information from the user. In an embodiment, content inclusion program 122 receives the requested information from the user. In an embodiment, content inclusion program 122 creates a user profile. In an embodiment, content inclusion program 122 stores the user profile. It should be appreciated that the process depicted in FIG. 2 illustrates one possible iteration of content inclusion program 122, which may be repeated for each opt-in request received by content inclusion program 122.

In step 210, content inclusion program 122 receives a request from a user to opt-in. A user may include, but is not limited to, a person who participates in a class, meeting, or gathering in a smart environment or virtual environment with a plurality of participants. In an embodiment, content inclusion program 122 receives a request from a user to opt-in to content inclusion program 122. In an embodiment, content inclusion program 122 receives a request from a user to opt-in to content inclusion program 122 through user interface 132 of user computing device 130. By opting-in, the user agrees to share data with database 124.

In step 220, content inclusion program 122 requests information from the user. In an embodiment, responsive to receiving a request from a user to opt-in, content inclusion program 122 requests information from the user. In an embodiment, content inclusion program 122 requests information from the user to create a user profile. In an embodiment, content inclusion program 122 requests information from the user through user interface 132 of user computing device 130. Information requested from the user includes, but is not limited to, information about user preferences (e.g., general user system settings such as alert notifications for user computing device 130) and information about alert notification preferences (e.g., alert notification preview, alert notification style (i.e., alert notification appearing on lock screen, notification center, and/or banner; alert notification appearing temporary or persistently; alert notification sound on or off; alert notification grouping automatically, by application, or off), and alert notification frequency).

In step 230, content inclusion program 122 receives the requested information from the user. In an embodiment, responsive to requesting information from the user, content inclusion program 122 receives the requested information from the user. In an embodiment, content inclusion program 122 receives the requested information from the user through user interface 132 of user computing device 130.

In step 240, content inclusion program 122 creates a user profile. In an embodiment, responsive to receiving the requested information from the user, content inclusion program 122 creates a user profile. In an embodiment, content inclusion program 122 creates a user profile for the user. In an embodiment, content inclusion program 122 creates a user profile with information input by the user during setup regarding the user (i.e., information necessary to create a user profile) as well as user preferences and alert notification preferences.

In step 250, content inclusion program 122 stores the user profile. In an embodiment, responsive to creating a user profile, content inclusion program 122 stores the user profile. In an embodiment, content inclusion program 122 stores the user profile in a database, e.g., database 124.

Figure 3:
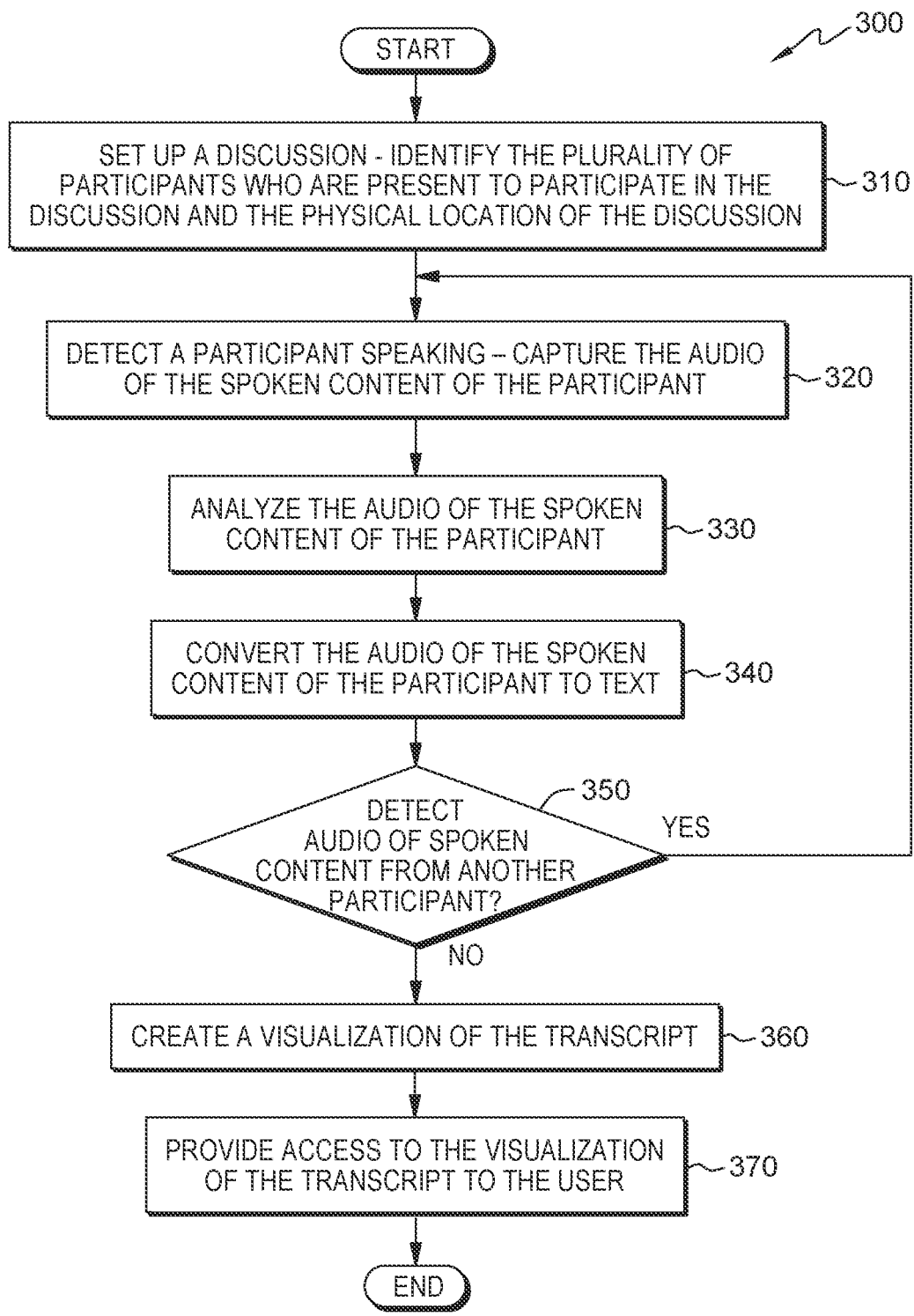
FIG. 3 is a flowchart illustrating the operational steps of the content inclusion program, on the server within the distributed data processing environment of FIG. 1, in accordance with an embodiment of the present invention.

FIG. 3 is a flowchart, generally designated 300, illustrating the operational steps of content inclusion program 122, on server 120 within distributed data processing environment 100 of FIG. 1, in accordance with an embodiment of the present invention. In an embodiment, content inclusion program 122 operates to enable the user, who is participating in a class, meeting, or gathering in a smart environment or virtual environment with a plurality of participants, to visualize a transcript of the discussion via a head-mounted AR device and to selectively copy one or more parts of the transcript that is contextually relevant for inclusion in a new document file or a previously created document file. It should be appreciated that the process depicted in FIG. 3 illustrates one possible iteration of the process flow, which may be repeated for each discussion.

In step 310, content inclusion program 122 enables a user to log into application 134 through user interface 132 of user computing device 130. In another embodiment, content inclusion program 122 enables the user to log into application 134 through user interface 142 of AR device 140. In an embodiment, content inclusion program 122 enables the user to join a discussion (i.e., identified by a given ID number) through application 134. The discussion takes place during a class, a meeting, or a gathering in a smart environment or a virtual environment. A plurality of participants wearing similar AR devices participate in the discussion.

In an embodiment, content inclusion program 122 authenticates AR device 140. In an embodiment, content inclusion program 122 downloads data associated with the user from the user profile of the first user stored in database 124 of server 120. In an embodiment, content inclusion program 122 loads the data associated with the first user onto AR device 140.

For example, user A, a student at a university, is attending a class. At the beginning of the class, user A, as well as the other students attending the class and the professor, log into the class's discussion, identified by the ID number BIO101, through application 134. User A wears AR device 140. The other students attending the class and the professor wear similar AR devices.

In an embodiment, content inclusion program 122 identifies the plurality of participants who are present (i.e., physically or virtually) to participate in the discussion by AR device. In an embodiment, content inclusion program 122 assigns a unique identification number to each of the plurality of participants present to participate in the discussion by AR device. In an embodiment, content inclusion program 122 stores the unique identification number of the plurality of participants present to participate in the discussion by AR device in a database, e.g., database 124.

In an embodiment, content inclusion program 122 authenticates the AR devices of the plurality of participants. In an embodiment, content inclusion program 122 enables the plurality of participants to visualize the transcripts of the spoken content once authenticated. In another embodiment, content inclusion program 122 enables the plurality of participants to copy the transcripts of the spoken content into a new or previously created document file once authenticated.

In an embodiment, content inclusion program 122 identifies the physical location where the discussion is occurring. In an embodiment, content inclusion program 122 creates an indoor positioning system that represents the physical location where the discussion is occurring. In an embodiment, content inclusion program 122 assigns a unique identification number to the physical location where the discussion is occurring. In an embodiment, content inclusion program 122 stores the indoor positioning system and the unique identification number to the physical location where the discussion is occurring in a database, e.g., database 124.

Continuing the example from above, content inclusion program 122 identifies the other students attending the class and the professor. Content inclusion program 122 assigns a unique identification number to each of the other students attending the class and the professor. Content inclusion program 122 also identifies the classroom where the class is occurring.

In step 320, content inclusion program 122 monitors the discussion that occurs between the user wearing AR device 140 and the plurality of participants wearing similar AR devices. In an embodiment, responsive to enabling the user to log into application 134 through user interface 132 of user computing device 130, content inclusion program 122 monitors the discussion that occurs between the user wearing AR device 140 and the plurality of participants wearing similar AR devices.

In an embodiment, content inclusion program 122 detects a first participant speaking. In an embodiment, content inclusion program 122 detects a first participant speaking using glass 146 of AR device 140.

In an embodiment, content inclusion program 122 captures the audio of the spoken content of the first participant. In an embodiment, content inclusion program 122 captures the audio of the spoken content of the first participant using glass 146 of AR device 140.

In an embodiment, content inclusion program 122 enables the first participant to assign one or more permissions to the plurality of participants. The one or more permissions assigned include, but are not limited to, which participants can review the transcript of the spoken content, which participants can copy one or more parts of the transcript of the spoken content from a visualization into a new or previously created document file, and how many parts of the transcript of the spoken content the participants can copy. In an embodiment, content inclusion program 122 enables the first participant to assign permissions to the plurality of participants based on the content of the transcript. In another embodiment, content inclusion program 122 enables the first participant to assign permissions to the plurality of participants based on which users of the plurality of participants are present (i.e., physically or virtually) to participate in the discussion.

Continuing the example from the previous step, participant B, the professor, poses a question to the class. Participant C, another student in the class, answers the question raised by participant B in a hyperbolic fashion. Content inclusion program 122 detects participant B and participant C speaking. Content inclusion program 122 captures the question raised by participant B as well as the answer offered by participant C.

In step 330, content inclusion program 122 analyzes the audio of the spoken content captured. In an embodiment, responsive to monitoring the discussion that occurs between the user wearing AR device 140 and the plurality of participants wearing similar AR devices, content inclusion program 122 analyzes the audio of the spoken content captured.

In an embodiment, content inclusion program 122 identifies the first participant who spoke. In an embodiment, content inclusion program 122 identifies the first participant by the tone of voice. In an embodiment, content inclusion program 122 identifies the first participant using glass 146 of AR device 140.

In an embodiment, content inclusion program 122 determines a direction from which the audio of the spoken content originated. In an embodiment, content inclusion program 122 determines the direction from which the audio of the spoken content originated using beam forming sensors 144 of AR device 140. Beam forming sensors 144 have a beam forming sensor feed to identify the direction from which the audio of the spoken content originated. In an embodiment, content inclusion program 122 determines where the first participant is located using the indoor positioning system. In an embodiment, content inclusion program 122 creates a direction vector representing the direction from which the audio of the spoken content originated.

In an embodiment, content inclusion program 122 determines a time when the audio of the spoken content originated. In an embodiment, content inclusion program 122 time stamps the audio of the spoken content with the time of origination. In an embodiment, content inclusion program 122 prepares a time scale to organize the audio of the spoken content captured according to when the audio of the spoken content was captured (i.e., from the earliest time stamp to the latest time stamp).

In step 340, content inclusion program 122 converts the audio of the spoken content to text. In an embodiment, responsive to analyzing the audio of the spoken content captured, content inclusion program 122 converts the audio of the spoken content to text.

In an embodiment, content inclusion program 122 converts the audio of the spoken content to text using glass 146 of AR device 140. In an embodiment, content inclusion program 122 creates a transcript with the text. In an embodiment, content inclusion program 122 presents the transcript in a similar fashion as the time scale previously prepared (i.e., from the earliest time stamp to the latest time stamp). In an embodiment, content inclusion program 122 includes the identification of the participant who spoke. In an embodiment, content inclusion program 122 distinguishes the individual parts of the text (i.e., the individual participants). In an embodiment, content inclusion program 122 includes the direction from which the audio of the spoken content originated (i.e., the direction vector). In an embodiment, content inclusion program 122 includes the time when the audio of the spoken content originated (i.e., the time stamp). In an embodiment, content inclusion program 122 stores the transcript of the text, the identification of the individual participants, the direction vector, and the time stamp in a database, e.g., database 124.

In decision 350, content inclusion program 122 determines whether audio of spoken content from a second participant has been detected (i.e., whether the discussion is ongoing or whether the discussion has ended). In an embodiment, responsive to converting the audio of the spoken content to text, content inclusion program 122 determines whether audio of spoken content from a second participant has been detected.

If content inclusion program 122 determines audio of spoken content from a second participant has been detected (decision 335, YES branch), then content inclusion program 122 returns to step 320, detecting a second participant speaking. If content inclusion program 122 determines audio of spoken content from a second participant has not been detected (decision 335, NO branch), then content inclusion program 122 proceeds to step 360, creating a visualization of the transcript of the text.

In step 360, content inclusion program 122 creates a visualization of the transcript of the text. In an embodiment, responsive to determining whether audio of spoken content from a second participant has been detected, content inclusion program 122 creates a visualization of the transcript of the text.

In an embodiment, content inclusion program 122 creates a visualization of the transcript of the text that the user can see on glass 146 of AR device 140. In an embodiment, content inclusion program 122 presents the transcript in a similar fashion as the time scale previously prepared (i.e., from the earliest time stamp to the latest time stamp). In an embodiment, content inclusion program 122 includes the identification of the participant who spoke. In an embodiment, content inclusion program 122 distinguishes the individual parts of the text (i.e., the individual participants). In an embodiment, content inclusion program 122 includes the direction from which the audio of the spoken content originated (i.e., the direction vector). In an embodiment, content inclusion program 122 distinguishes the individual parts of the text and includes the direction from which the audio of the spoken content originated in the transcript so that the user can selectively identify from whom and from what direction the spoken content originated. In an embodiment, content inclusion program 122 includes the time when the audio of the spoken content originated (i.e., the time stamp).

For example, a Math classroom has a different direction vector than a Physics classroom. Content inclusion program 122 includes the direction from which the first participant's voice originated (i.e., the direction vector) for ease of differentiation while visualizing the transcript of the text in an AR system.

In step 370, content inclusion program 122 provides access to the visualization of the transcript of the text to the user. In an embodiment, responsive to creates a visualization of the transcript of the text, content inclusion program 122 provides access to the visualization of the transcript of the text to the user.

In an embodiment, content inclusion program 122 provides access to the visualization of the transcript of the text to the user through glass 146 of AR device 140. In another embodiment, content inclusion program 122 provides access to the visualization of the transcript of the text to the user through user interface 132 of user computing device 130.

In an embodiment, content inclusion program 122 enables the user to select one or more parts of the transcript from the visualization. In an embodiment, content inclusion program 122 enables the user to select one or more parts of the transcript from the visualization using glass 146 of AR device 140. In another embodiment, content inclusion program 122 enables the user to select one or more parts of the transcript from the visualization using user interface 132 of user computing device 130.

In an embodiment, content inclusion program 122 enables the user to create a new document file with the one or more parts of the transcript selected by the user. In another embodiment, content inclusion program 122 enables the user to edit an existing document file to include the one or more parts of the transcript selected by the user. In an embodiment, content inclusion program 122 enables the user to copy the one or more parts of the transcript into a new document file or an existing document file in a user-defined position.

Figure 4:
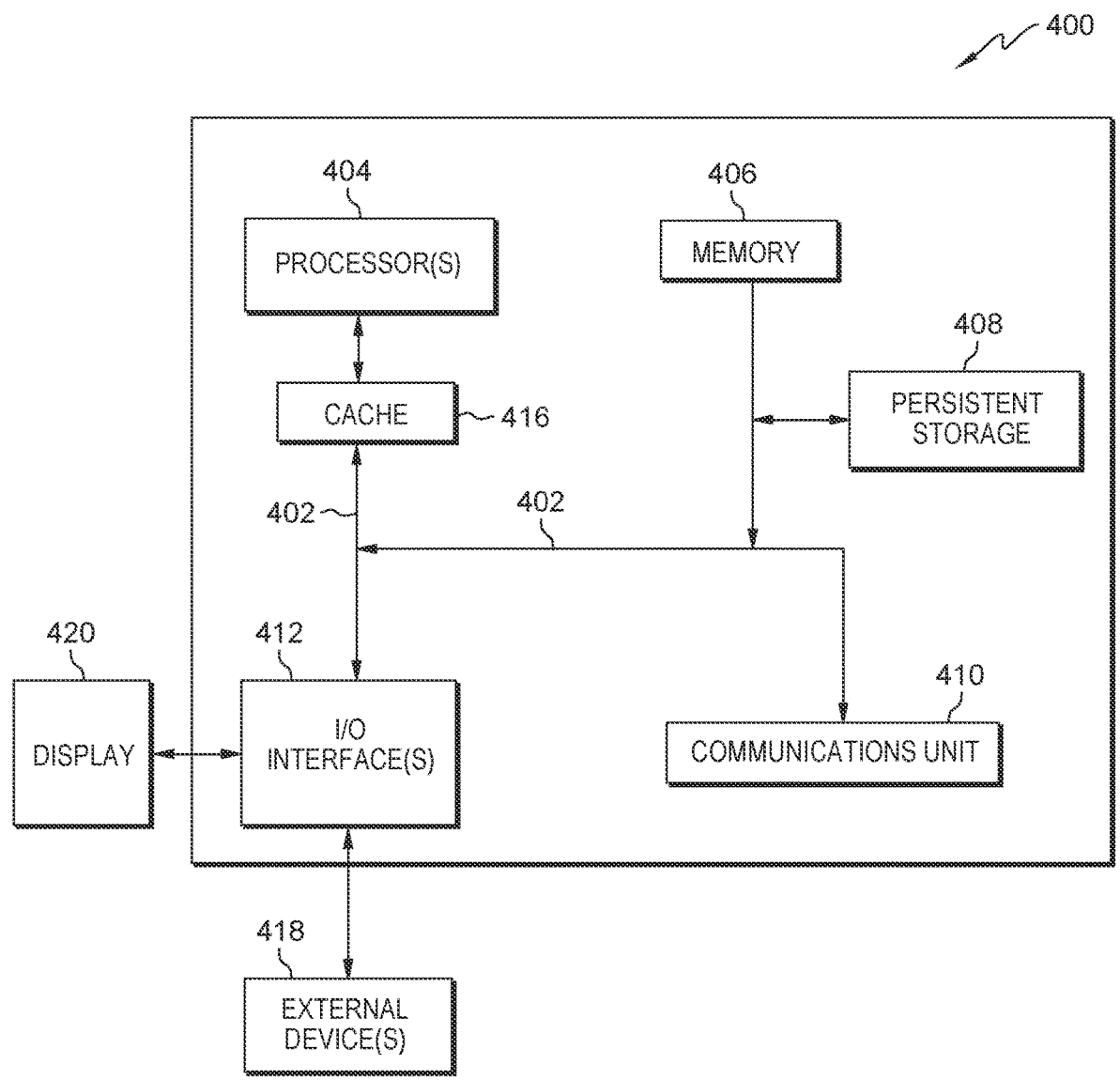
FIG. 4 is a block diagram illustrating the components of a computing device within the distributed data processing environment of FIG. 1, in accordance with an embodiment of the present invention.

FIG. 4 is a block diagram illustrating the components of computing device 400 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made. Computing device 400 includes processor(s) 404, memory 406, cache 416, communications fabric 402, persistent storage 408, input/output (I/O) interface(s) 412, and communications unit 410. Communications fabric 402 provides communications between memory 406, cache 416, persistent storage 408, input/output (I/O) interface(s) 412, and communications unit 410. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a cross switch. Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program instructions and data (e.g., software and data 414) used to practice embodiments of the present invention may be stored in persistent storage 408 and in memory 406 for execution by one or more of the respective processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408. Software and data 414 can be stored in persistent storage 408 for access and/or execution by one or more of the respective processor(s) 404 via cache 416. With respect to user computing device 130, software and data 414 includes user interface 132. With respect to server 120, software and data 414 includes content inclusion program 122.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data (e.g., software and data 414) used to practice embodiments of the present invention may be downloaded to persistent storage 408 through communications unit 410.

I/O interface(s) 412 allows for input and output of data with other devices that may be connected to each computer system. For example, I/O interface(s) 412 may provide a connection to external device(s) 418, such as a keyboard, a keypad, a touch screen, and/or some other suitable input device. External device(s) 418 can also include portable computer readable storage media, such as, for example, thumb drives, portable optical or magnetic disks, and memory cards. Program instructions and data (e.g., software and data 414) used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    capturing, by one or more processors, audio of a spoken content of a first participant of a discussion via an augmented reality (AR) device worn by a user;
    prior to capturing the audio of the spoken content of the first participant of the discussion via the AR device worn by the user, identifying, by the one or more processors, a plurality of participants, including the first participant, who are each physically present at a physical location to participate in the discussion, wherein each of the plurality of participants are identified based on the AR device that they are wearing;
    analyzing, by the one or more processors, the audio of the spoken content of the first participant;
    converting, by the one or more processors, the audio of the spoken content of the first participant to text to create a transcript;
    creating, by the one or more processors, a visualization of the transcript;
    presenting, by the one or more processors, the visualization of the transcript to the user via the AR device; and
    enabling, by the one or more processors, the user to copy one or more parts of the transcript into a document file via a selection support,
    wherein enabling the user to copy the one or more parts of the transcript into the document file via the selection support further comprises:
        enabling, by the one or more processors, the user to point at a location of the first participant; and
        selecting, by the one or more processors, one or more parts of the transcript associated with the first participant,
    wherein the AR device provides a view of the physical location of the discussion and includes a computer-generated graphic including the visualization of the transcript overlaid on the view of the physical location.

2. The computer-implemented method of claim 1, further comprising:
    assigning, by the one or more processors, a first unique identification number to each participant of the plurality of participants;
    authenticating, by the one or more processors, the AR device of each participant of the plurality of participants;
    identifying, by the one or more processors, the physical location where the discussion is occurring;
    assigning, by the one or more processors, a second unique identification number to the physical location where the discussion is occurring; and
    creating, by the one or more processors, an indoor positioning system that represents the physical location where the discussion is occurring.

3. The computer-implemented method of claim 1, further comprising:
    prior to capturing the audio of the spoken content of the first participant of the discussion via the AR device worn by the user, enabling, by the one or more processors, the first participant to assign one or more permissions to each participant of the plurality of participants, wherein the one or more permissions determine whether each participant of the plurality of participants can copy the one or more parts of the transcript into the document file.

4. The computer-implemented method of claim 1, wherein analyzing the audio of the spoken content of the first participant further comprises:
- identifying, by the one or more processors, the first participant by a tone of voice;
- determining, by the one or more processors, a direction from which the audio of the spoken content of the first participant originated via a beam forming sensor on the AR device worn by the user and the indoor positioning system;
- creating, by the one or more processors, a direction vector representing the direction from which the audio of the spoken content of the first participant originated;
- determining, by the one or more processors, a time when the audio of the spoken content of the first participant originated;
- creating, by the one or more processors, a time stamp representing the time when the audio of the spoken content of the first participant originated; and
- preparing, by the one or more processors, a time scale to organize the audio of the spoken content of the first participant according to when the audio was captured.

5. The computer-implemented method of claim 4, wherein the transcript includes an identifying factor of the first participant, the direction vector representing the direction from which the audio of the spoken content of the first participant originated, and the time stamp representing the time when the audio of the spoken content of the first participant originated.

6. The computer-implemented method of claim 1, wherein the document file is a new document file or a previously created document file, and wherein the one or more parts of the transcript are placed in a user-defined position.

7. A computer program product comprising:
- one or more computer readable storage media and program instructions stored on the one or more computer readable storage media, the program instructions comprising:
- program instructions to capture audio of a spoken content of a first participant of a discussion via an AR device worn by a user;
- prior to capturing the audio of the spoken content of the first participant of the discussion via the AR device worn by the user, program instructions to identify, by the one or more processors, a plurality of participants, including the first participant, who are each physically present in a physical location to participate in the discussion, wherein each of the plurality of participants are identified based on the AR device that they are wearing;
- program instructions to analyze the audio of the spoken content of the first participant;
- program instructions to convert the audio of the spoken content of the first participant to text to create a transcript;
- program instructions to create a visualization of the transcript;
- program instructions to present the visualization of the transcript to the user via the AR device; and
- program instructions to enable the user to copy one or more parts of the transcript into a document file via a selection support,
- wherein enabling the user to copy the one or more parts of the transcript into the document file via the selection support further comprises:
  - program instructions to enable the user to point at a location of the first participant; and
  - program instructions to select one or more parts of the transcript associated with the first participant,
- wherein the AR device provides a view of the physical location of the discussion and includes a computer-generated graphic including the visualization of the transcript overlaid on the view of the physical location.

8. The computer program product of claim 7, further comprising:
- program instructions to assign a first unique identification number to each participant of the plurality of participants;
- program instructions to authenticate the AR device of each participant of the plurality of participants;
- program instructions to identify the physical location where the discussion is occurring;
- program instructions to assign a second unique identification number to the physical location where the discussion is occurring; and
- program instructions to create an indoor positioning system that represents the physical location where the discussion is occurring.

9. The computer program product of claim 7, further comprising:
- prior to capturing the audio of the spoken content of the first participant of the discussion via the AR device worn by the user, program instructions to enable the first participant to assign one or more permissions to each participant of the plurality of participants, wherein the one or more permissions determine whether each participant of the plurality of participants can copy the one or more parts of the transcript into the document file.

10. The computer program product of claim 7, wherein analyzing the audio of the spoken content of the first participant further comprises:
- program instructions to identify the first participant by a tone of voice;
- program instructions to determine a direction from which the audio of the spoken content of the first participant originated via a beam forming sensor on the AR device worn by the user and the indoor positioning system;
- program instructions to create a direction vector representing the direction from which the audio of the spoken content of the first participant originated;
- program instructions to determine a time when the audio of the spoken content of the first participant originated;
- program instructions to create a time stamp representing the time when the audio of the spoken content of the first participant originated; and
- program instructions to prepare a time scale to organize the audio of the spoken content of the first participant according to when the audio was captured.

11. The computer program product of claim 10, wherein the transcript includes an identifying factor of the first participant, the direction vector representing the direction from which the audio of the spoken content of the first participant originated, and the time stamp representing the time when the audio of the spoken content of the first participant originated.

12. The computer program product of claim 7, wherein the document file is a new document file or a previously created document file, and wherein the one or more parts of the transcript are placed in a user-defined position.

13. A computer system comprising:
one or more computer processors;
one or more computer readable storage media;
program instructions collectively stored on the one or more computer readable storage media for execution by at least one of the one or more computer processors, the stored program instructions comprising:
program instructions to capture audio of a spoken content of a first participant of a discussion via an AR device worn by a user;
prior to capturing the audio of the spoken content of the first participant of the discussion via the AR device worn by the user, program instructions to identify, by the one or more processors, a plurality of participants, including the first participant, who are each physically present in a physical location to participate in the discussion, wherein each of the plurality of participants are identified based on the AR device that they are wearing;
program instructions to analyze the audio of the spoken content of the first participant;
program instructions to convert the audio of the spoken content of the first participant to text to create a transcript;
program instructions to create a visualization of the transcript;
program instructions to present the visualization of the transcript to the user via the AR device; and
program instructions to enable the user to copy one or more parts of the transcript into a document file via a selection support,
wherein enabling the user to copy the one or more parts of the transcript into the document file via the selection support further comprises:
program instructions to enable the user to point at a location of the first participant; and
program instructions to select one or more parts of the transcript associated with the first participant,
wherein the AR device provides a view of the physical location of the discussion and includes a computer-generated graphic including the visualization of the transcript overlaid on the view of the physical location.

14. The computer system of claim 13, further comprising:
program instructions to assign a first unique identification number to each participant of the plurality of participants;
program instructions to authenticate the AR device of each participant of the plurality of participants;
program instructions to identify the physical location where the discussion is occurring;
program instructions to assign a second unique identification number to the physical location where the discussion is occurring; and
program instructions to create an indoor positioning system that represents the physical location where the discussion is occurring.

15. The computer system of claim 13, further comprising:
prior to capturing the audio of the spoken content of the first participant of the discussion via the AR device worn by the user, program instructions to enable the first participant to assign one or more permissions to each participant of the plurality of participants, wherein the one or more permissions determine whether each participant of the plurality of participants can copy the one or more parts of the transcript into the document file.

16. The computer system of claim 13, wherein analyzing the audio of the spoken content of the first participant further comprises:
program instructions to identify the first participant by a tone of voice;
program instructions to determine a direction from which the audio of the spoken content of the first participant originated via a beam forming sensor on the AR device worn by the user and the indoor positioning system;
program instructions to create a direction vector representing the direction from which the audio of the spoken content of the first participant originated;
program instructions to determine a time when the audio of the spoken content of the first participant originated;
program instructions to create a time stamp representing the time when the audio of the spoken content of the first participant originated; and
program instructions to prepare a time scale to organize the audio of the spoken content of the first participant according to when the audio was captured.

17. The computer system of claim 13, wherein the document file is a new document file or a previously created document file, and wherein the one or more parts of the transcript are placed in a user-defined position.

\* \* \* \* \*